United States Patent

Yamamoto et al.

[15] 3,674,755
[45] July 4, 1972

[54] PROCESS FOR COPOLYMERIZING ALPHA-MONOOLEFINS WITH OR WITHOUT A POLYENE, USING CATALYST COMPRISING ORGANOALUMINUM COMPOUND AND VANADYL COMPOUND CONTAINING CYCLIC HYDROCARBON GROUP

[72] Inventors: Keisaku Yamamoto, Ibaraki; Hiroyoshi Takao, Takatsuki; Masaaki Hirooka, Ibaraki; Teruo Oshima, Nishinomiya, all of Japan

[73] Assignee: Sumitomo Chemical Company Limited, Osaka, Japan

[22] Filed: July 23, 1969

[21] Appl. No.: 844,187

[30] Foreign Application Priority Data

July 30, 1968 Japan................................43/53815

[52] U.S. Cl. .....................................260/80.78, 260/88.2 R
[51] Int. Cl.................C08f 15/40, C08f 19/00, C08f 15/04
[58] Field of Search.................................260/88.2 R, 80.78

[56] References Cited

UNITED STATES PATENTS

| | | | |
|---|---|---|---|
| 3,052,660 | 9/1962 | Osgan | 260/88.2 |
| 3,203,940 | 8/1965 | Long | 260/88.2 |
| 3,453,250 | 7/1969 | Natta et al. | 260/88.2 |
| 3,483,173 | 12/1969 | Natta et al. | 260/80.78 |
| 3,535,269 | 10/1970 | Tanaka et al. | 252/429 |
| 3,547,855 | 12/1970 | Loveless | 260/80.78 |
| 3,562,228 | 2/1971 | Matthews et al. | 260/80.78 |

*Primary Examiner*—Joseph L. Schofer
*Assistant Examiner*—Richard A. Gaither
*Attorney*—James J. Long

[57] ABSTRACT

Ethylene, propylene and similar olefins, with or without a conjugated or non-conjugated polyene (e.g., isoprene, 1,4-hexadiene, 5-ethylidene-2-norbornene) are copolymerized in solution with a catalyst based on organoaluminum compound (e.g., ethylaluminum sesquichloride) and vanadyl compound of the type $VO(OR_m)X_{3-m}$ where R is cyclic hydrocarbon, X is halogen and $m$ is 1 to 3 (e.g., vanadyl tricyclohexoide, monovanadyl dicyclohexoxide, dichlorovanadyl bornyloxide, monochlorovanadyl dinorbornyloxide). Use of a vanadyl compound having a cyclic hydrocarbon substituent provides a catalyst having enhanced ability to incorporate diene, including conjugated diene, into the copolymer.

28 Claims, No Drawings

PROCESS FOR COPOLYMERIZING ALPHA-MONOOLEFINS WITH OR WITHOUT A POLYENE, USING CATALYST COMPRISING ORGANOALUMINUM COMPOUND AND VANADYL COMPOUND CONTAINING CYCLIC HYDROCARBON GROUP

Our copending application Ser. No. 844,178 filed of even date herewith claims, as new chemicals and compositions, the vanadium compounds and catalysts employed in the polymerization process of this invention.

The present invention relates to a process for producing an olefinic hydrocarbon copolymer by the use of a novel catalyst which comprises as essential components a novel vanadium compound and an organic aluminum compound. In more particular, the present invention relates to a process for producing an amorphous olefinic hydrocarbon copolymer in which a polyene compound is effectively introduced by the aid of a novel catalyst.

There have heretofore been proposed various processes for producing an amorphous olefin copolymer. Particularly, Ziegler Natta type catalysts are effective and among them, the combinations of a vanadium compound with an organic aluminum compound are excellent. Representative kinds of said vanadium compounds include a halogen compounds, alkoxy compounds, acetyl acetonates and the like. These have industrial merit for the purpose of producing an amorphous copolymer.

In producing sulfur-vulcanizable rubbery compounds by copolymerizing ethylene, α-olefins and diene compounds or other polyene compounds, with the use of the Ziegler-Natta type catalysts, the diene compounds or other polyene compounds, particularly conjugated diene compounds, have in general a retarding effect on the polymerization. Italian Pat. No. 664,769 (British Pat. No. 983,437) proposes a process for readily copolymerizing a conjugated diolefin with the use of an organoaluminum compound containing a bulky substituent.

In general, the Ziegler-Natta type catalysts which use vanadium compounds containing alkoxy groups such as vanadyl trialkoxide $VO(OR)_3$, mono-halogenated vanadyl alkoxide $VO(OR)_2X$ and di-halogenated vanadyl monoalkoxide $VO(OR)X_2$ are suitable for the production of a copolymer having narrow molecular weight distribution and composition distribution, and produce a high yield of copolymers per a unit weight of the catalysts.

The use of such a compound containing an alkoxy group as a catalyst in the polymerization and copolymerization of olefins has been proposed in Japanese Pat. Publication No. 7394/1961, Japanese Pat. Publication No. 7132/1963, Japanese Pat. Publication No. 13790/1963 and the like. The hydrocarbon residue in the disclosed alkoxy groups is a straight-chain or branched-chain aliphatic group. The active site of the Ziegler-Natta type catalysts in the polymerization has been reported to exist on the transition metal. However, the effect of a stereometrically bulky group attached to a transition metal has not been known. The present inventors have found that when a stereometrically bulky group containing a cyclic hydrocarbon group having five or more carbon atoms, particularly a cycloaliphatic hydrocarbon group, including, bridged cyclic hydrocarbon group, spiro type hydrocarbon group and the like, is introduced as the aforedescribed hydrocarbon residue of the alkoxy compound of vanadium and the resulting novel vanadium compound is employed as the vanadium-containing component of the catalyst, such catalyst has excellent polymerization activity and readily makes a polyene compound, especially a diene compound, copolymerize. Further, this kind of novel polymerization catalyst can be used for the copolymerization of ethylene, propylene or other α-olefins in general.

That is to say, the present invention provides a process of producing an olefinic hydrocarbon copolymer, characterized by contacting ethylene, an α-olefin having 3 to 20 carbon atoms and, if desired, a polyene compound, with (A) a vanadium compound having the general formula $VO(OR)_mX_{3-m}$ wherein R is a group containing a cyclic hydrocarbon having 5 to 20 carbon atoms, X is a halogen atom, and $m$ is an integer from 1 to 3, and (B) an organoaluminum compound having the general formula $AlR'_nX'_{3-n}$ wherein R' is a hydrocarbon group having 1 to 20 carbon atoms, X' is a halogen or hydrogen atom, and $n$ is a number from 1 to 3.

The cyclic hydrocarbon radical represented by R in the general formula for the vanadium compound (A) can include, for example, an alicyclic hydrocarbon group, bridged cyclic hydrocarbon group, spiro type hydrocarbon group and the like. These groups are exemplified by cyclopentyl, cyclohexyl, cycloheptyl, cyclooctyl, 3-cyclopentenyl, 2-cyclohexenyl, 2-cycloheptenyl, 4-cyclooctenyl, 2-methy-cyclopentyl, 3-tertiary-butyl-cyclohexyl, 4-phenyl-cyclohexyl, 1,3-dimethyl-cyclohexyl, 3-methyl-6-isopropyl-cyclohexyl, cyclopentyl-methyl, cyclohexyl-ethyl, cycloheptyl-ethyl, 2,2-biscyclohexyl-ethyl, 2-norbornyl, bornyl, 5-norbornen-2-yl, 3-pinanyl, cyclopentane-spiro-cyclobutan-3'-yl, spiro-bicyclohexan-4-yl, 2-indenyl, 1-indanyl and the like.

Compounds having such groups are illustrated by vanadyl tricyclopentoxide, vanadyl tricyclohexoxide, vanadyl tri-(3-cyclopentenoxide), vanadyl tri-(3-methyl-cyclohexoxide), vanadyl tri-(3-tertiary-butylcyclohexoxide), vanadyl trimenthoxide, vanadyl tri-(cyclohexylmenthoxide), vanadyl tribornyloxide, vanadyl tri-(5-norbornen-2-yloxide), vanadyl tri-(2-indanyloxide), chlorovanadyl-di-(cyclopentoxide), chlorovanadyl-di-(cyclohexoxide), chlorovanadyl-di-(3-cyclopentenoxide), chlorovanadyl-di-(3-methyl-cyclohexoxide), chlorovanadyl-di-(3-tertiary-butyl-cyclohexoxide), chlorovanadyl-di-(menthoxide), chlorovanadyl-di-(cyclohexylmethoxide), chlorovanadyl-di-(bornyloxide), chlorovanadyl-di-(5-norbornene-2-yloxide), chlorovanadyl-di-(2-indanyloxide), dichlorovanadyl-cyclopentoxide, dichlorovanadyl-cyclohexoxide, dichlorovanadyl-(3-cyclopentenoxide), dichlorovanadyl-(3-methyl-cyclohexoxide), dichlorovanadyl-(3-tertiary-butyl-cyclohexoxide), dichlorovanadyl-menthoxide, dichlorovanadyl-(cyclohexylmethoxide), dichlorovanadyl-bornyloxide, dichlorovanadyl-(5-norbornene-2-yloxide), dichlorovanadyl-(2-indanyloxide) and the like.

These vanadium compounds may be synthesized, for example, in accordance with the following processes:

a. A vanadium compound having the general formula $VO(OR'')_mX_{3-m}$ wherein R'' is an alkyl group having one to five carbon atoms, X is a halogen atom, and $m$ is an integer of 1 to 3, is contacted with an alcohol having the general formula ROH wherein R is a group containing a cyclic hydrocarbon having 5 to 20 carbon atoms.

b. Vanadyl trichloride is contacted with an alcohol having the general formula ROH wherein R has the same significance as mentioned above.

c. A vanadium compound having the general formula $VO(OR)_3$ wherein R has the same significance as mentioned above is contacted with a carboxylic halide having the general formula R''COCl wherein R'' has the same significance as mentioned above.

The vanadyl trialkoxide compounds referred to in the present process may be synthesized, for example, by ester interchange reaction between an alcohol (ROH) having said group containing the cyclic hydrocarbon and vanadyl ethoxide in an inert solvent, and thereafter removing an azeotrope of ethanol and solvent. The reaction proceeds as follows:

Further, the vanadyl halogen alkoxides may be synthesized, for example, by reacting a vanadyl trialkoxide having said group containing the cyclic hydrocarbon with acetyl chloride in an inert solvent, and then removing the solvent and acetic ester. The reaction proceeds as follows:

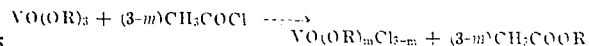

Furthermore, a vanadyl trialkoxide compound or a vanadyl halogen alkoxide may be produced by reacting vanadyl trichloride with an alcohol having the group containing the cyclic hydrocarbon in an inert solvent.

The reaction proceeds as follows:

$$VOX_3 + mROH \longrightarrow VO(OR)_mX_{3-m} + mHX$$

In the case where two or more of the groups containing the cyclic hydrocarbon exist in the vanadium compounds thus reproduced, said groups may of course be identical with or different from one another.

Further, these vanadium compounds are not required to be single compounds, and mixtures of two kinds or more of said compounds and in some cases, reaction mixtures produced by the foregoing various reactions may also be used as they are as one component of the polymerization catalysts.

These reactions may be carried out in the absence of a solvent, but are more efficaciously carried out in an inert solvent. As a solvent a hydrocarbon compound or a halogenated hydrocarbon compound is preferred. For example, there may be mentioned hexane, heptane, octane, petroleum ether, ligroin, other petroleum fractions, benzene, toluene, xylene, cyclohexane, methyl cyclohexane, methylene dichloride, ethylene dichloride, chlorobenzene and the like.

In particular, the use of an aromatic hydrocarbon compound such as benzene and the like is preferred because it forms an azeotrope with the alcohol or ester, and the reaction proceeds uniformly. The use of an aliphatic hydrocarbon such as heptane causes tar-like materials to be formed as by-products in some cases. However, the use of the aromatic compounds usually gives a uniform system.

The organoaluminum compounds used in the present process are represented by the general formula $AlR'_nX'_{3-n}$. In said general formula, $R'$ is a group such as an alkyl, aryl, aralkyl, alkylaryl, cycloalkyl and the like, and is particularly preferred to be an alkyl group having one to eight carbon atoms. Further, said $R'$ may be other hydrocarbon groups, for example, a group such as alkenyl, cyclopentadienyl and the like, if desired.

$X'$ is chlorine, bromine or iodine, and may be fluorine, if desired, and $n$ is a positive number of 3 or less, preferably 1, 1.5, 2 or 3. These compounds are exemplified by methyl aluminum dichloride, ethyl aluminum dichloride, isobutyl aluminum dichloride, ethyl aluminum dibromide, allyl aluminum dichloride, vinyl aluminum dichloride, ethyl aluminum sesquichloride, methyl aluminum sesquichloride, methyl aluminum sesquibromide, ethyl aluminum sesquiiodide, isobutyl aluminum sesquichloride, hexyl aluminum sesquichloride, diethyl aluminum chloride, diethyl aluminum bromide, dipropyl aluminum chloride, didodecyl aluminum chloride, diethyl aluminum fluoride, ethylphenyl aluminum chloride, trimethyl aluminum, triethyl aluminum, tripropyl aluminum, triisobutyl aluminum, trihexyl aluminum, tridecyl aluminum, aluminum hydrides, mixtures of these compounds, mixtures thereof with a halogenated aluminum such as aluminum chloride, aluminum bromide and aluminum iodide, and the like. Among these organic aluminum compounds, an alkylaluminium halogen compound specifically gives the preferred result.

The present process is a process for carrying out the polymerization with the use of a catalyst system having the afore-described vanadium compounds and organic aluminum compounds as essential components. However, if required, other appropriate compounds may be added thereto as a third component. As said compounds, there can be enumerated, for example, a compound which is an electron donor and forms a coordination compound or a charge transfer complex with the organic aluminum compounds or vanadium compounds, e.g. amines, cyclo-nitrogen compounds, acid amides, ethers, esters, ketones, aldehydes, a compound of elements in the Vb Group such as phosphorus, arsenic, antimony, bismuth and the like, various chelating agents, or the like. Or, there are available various oxidizing compounds which are considered effective for preventing excessive reduction of vanadium compounds by the organic aluminum compounds. Among these, there may be mentioned halogens, sulfur, metal halides, oxygen, nitro compounds, nitroso compounds, organic nitrates, nitrites, N-oxide compounds, p-oxide compounds, azo compounds, organic sulfides. disulfides, quinones, acid halides and the like. Or, a reagent having molecular weight regulating effect, for example, hydrogen or the like can be further added.

The $\alpha$-olefins used in the present process are represented by the general formula $CH_2=CH \cdot R'''$ wherein $R'''$ is a hydrocarbon group having 1 to 20 carbon atoms. There may be mentioned as representatives thereof propylene, butene-1, pentene-1, 3-methyl-butene-1, hexene-1, 3-methylpentene-1, 4-methylpentene-1, heptene-1, decene-1, vinyl-cyclopentane and the like. Among these, a lower alkene such as propylene, butene-1 and the like is specifically often used.

A sulfur-vulcanizable elastomer can be produced by adding a polyene compound in the production of an amorphous copolymer of ethylene and $\alpha$-olefins. As this kind of polyene compound, there can be used conjugated diene compounds such as isoprene, piperylene and the like and non-conjugated polyene compounds such as bridged cyclic hydrocarbon compounds, monocyclic compounds, heterocyclic compounds, acyclic compounds, spiro type compounds and the like. As the non-conjugated polyene compounds, there may be mentioned as examples dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1'-butenyl)-2-norbornene, 5-(2'-butenyl)-2-norbornene, cyclooctadiene, vinylcyclohexene, 1,5,9-cyclododecatolyene, 6-methyl-4,7,8,9-tetrahydroindene, 2,2'-dicyclopentenyl, trans-1,2-divinylcyclobutane, 1,4-hexadiene, 1,6-octadiene, 6-methyl-1,5-heptadiene and the like. Even aliphatic diene compounds which have heretofore been known not to copolymerize readily can be copolymerized readily.

There is specifically no restriction in the ratio between the organic aluminum compounds and the vanadium compounds used in the present process, but the use of a molar ratio of 1:1 to 10,000:1 and the like, particularly 2:1 to 300:1, brings about the preferred result readily. Regarding the concentration in the reaction medium, a concentration of vanadium compounds of 0.01 to 50 millimoles/l., particularly 0.1 to 10 millimoles/l., is often used. However, in some cases, even a lower concentration of 0.01 millimole/l. or less, for example the order of $10^{+4}$ millimole/l., shows excellent activity. As the concentration of organic aluminum compounds in the reaction system, a concentration of 0.1 to 100 millimoles/l., particularly 1 to 20 millimoles/l., is often used.

There is specifically no restriction in the sequence of addition of the catalysts and monomers, and the addition thereof may be carried out in accordance with conventional procedure. However, in general, the procedure of adding separately the catalyst components (A) and (B) to the polymerization system in the presence of monomers gives higher catalytic activity than does the use of a pre-mixture of said catalyst components. However, in view of the change in the catalytic activity with elapsed time, there are some cases where it is better to use a product obtained by mixing and reacting the catalyst components in advance.

The monomer components, particularly the polyene compounds, may be dissolved in advance in the reaction medium or may be added continuously or intermittently.

In the production of amorphous elastomers in the present process, such a charging condition is preferred that the ethylene constitutes 85 mole percent or less of the mixture of ethylene and alpha-olefins.

The polymerization reaction can be carried out under a reduced pressure or under an elevated pressure up to 100 Kg./cm². Inert gases may be present. As the polymerization temperature, any conventional temperature from a low temperature such as −78° C. to a heated state such as +100° C.

can be used, but in general, a temperature in the range of −35° C. to 70° C. gives favorable results. The catalysts in the present process are excellent in the durability of catalytic activity, but it is desirable to polymerize at a relatively low temperature to prolong the catalytic activity and achieve high catalytic efficiency.

In the operation of the present process, the polymerization may be carried out in the absence of a solvent, for example, in a liquefied monomer, or with the use of an inert medium. As the inert medium, a hydrocarbon compound or a halogenated hydrocarbon compound is suitable. For example, there can be mentioned propane, butane, pentane, hexane, heptane, octane, petroleum ether, ligroin, other petroleum mixed solvents, benzene, toluene, xylene, cyclohexane, methyl cyclohexane, methylene dichloride, ethylene dichloride, trichloroethane, tetrachloroethane, butyl chloride, chlorobenzene, bromobenzene and the like.

After completion of the polymerization reaction, the resultant polymer can be purified and recovered by after-treatment in the usual manner. Applicable treatments are alcohol treatment, alcohol-hydrochloric acid treatment, water treatment, steam treatment, aqueous hydrochloric acid treatment, alkali treatment, aqueous emulsifier solution treatment, after-treatment with chelating agents and other conventional after-treatments useful for polymerizates obtained with the Ziegler-Natta catalysts. Alternatively, the solid material may be recovered by salting out without said treatments or by removing the solvent as it is. A stabilizer or other additives may be added during or after said treatments.

The present process will be further substantially explained with reference to the following examples, but the present process is not to be limited by these examples.

EXAMPLE 1

A 150 ml. four-necked flask provided with a stirrer, thermometer, dropping funnel and reflux condenser was evacuated and filled with argon. Then 20.1 g. (100 millimoles) of vanadyl triethoxide dissolved in 50 ml. of benzene was charged. Subsequently, 31.2 ml. (300 millimoles) of cyclohexanol were added thereto and refluxing was effected at a temperature of 90° to 100° C for about 2 hours.

The ethanol produced was removed together with benzene from the reaction mixture by azeotropic distillation, and further unreacted materials were removed by distillation under reduced pressure.

There were obtained 25.5 g. of vanadyl tricyclohexoxide as the reaction product. The same was a yellow crystalline solid having a melting point of 44.5° C.

One liter of normal heptane was charged into a 2 l. flask. A mixed gas of 40 mole percent of ethylene and 60 mole percent of propylene was passed to the resultant flask placed in a thermostat maintained at 30° C. at the rate of 10 Nl./min. until the heptane was saturated. Subsequently, 3 millimoles of ethyl aluminum sesquichloride (AlEt$_{1.5}$Cl$_{1.5}$) and 0.3 millimole of vanadyl tricyclohexoxide were added in that order, and further ethylene and propylene were passed in for 30 minutes while stirring.

30 milliliters of methanol were added to the reaction mixture to stop the reaction. After washing the resultant reaction mixture sufficiently with methanol, the mixture was charged into a large amount of methanol to coagulate the copolymer. After drying the coagulum, there were obtained 28.4 g. of a white amorphous solid copolymer.

The intrinsic viscosity of the copolymer in a xylene solution measured at 70° C. was 2.4 dl./g. The propylene content of the copolymer as determined by infrared absorption spectrum was 40.8 mole percent.

Using vanadyl trichloride in place of vanadyl tricyclohexoxide gives only 23.5 g. of the copolymer, which shows that vanadyl tricyclohexoxide gives a higher polymerization activity.

In carrying out the polymerization under the same conditions as mentioned above except for the use of butene-1 in place of propylene, there were obtained 16.3 g. of copolymer.

EXAMPLE 2

A 100 ml. four-necked flask provided with a stirrer, thermometer, reflux condenser and dropping funnel was evacuated and filled with argon, and 14.3 g. (39.3 millimoles) of vanadyl tricyclohexoxide dissolved in 25 ml. of benzene was charged. Then, 2.79 ml. (39.3 millimoles) of acetyl chloride dissolved in 10 ml. of benzene were gradually added dropwise while stirring. After completion of the dropwise addition, refluxing was effected at an external temperature of 100° C. for about 1 hour.

Removing the solvent and cyclohexyl acetate from the reaction mixture by distillation, there were obtained 12 g. of monochlorovanadyl-dicyclohexoxide.

Repeating the reaction in the same manner as in Example 1 except that 0.3 millimole of monochlorovanadyl-dicyclohexoxide thus obtained was used in place of vanadyl tricyclohexoxide there were obtained 30.4 g. of an amorphous solid copolymer having an intrinsic viscosity of 4.30 dl./g. and a propylene content of 40.2 mole percent.

EXAMPLE 3

By mixing and reacting a solution of 4.62 g. (30 millimoles) of borneol in 50 ml. of benzene and a solution of 5.20 g. (30 millimoles) of vanadyl trichloride in 50 ml. of benzene, there was prepared a solution of dichlorovanadylbornyloxide having a concentration of 0.3 millimole/l.

Repeating the polymerization in the same manner as in Example 1 except that 0.3 millimole of dichlorovanadylbornyloxide thus produced in place of vanadyltricyclohexoxide, 3 millimoles of trihexyl aluminum in place of ethyl aluminum sesquichloride and 1 l. of tetrachloroethylene as a solvent in place of normal heptane were used, there were obtained 8.74 g. of a white amorphous copolymer having an intrinsic viscosity of 3.21 dl./g. and a propylene content of 50.7 mole percent.

EXAMPLE 4

1 liter of normal heptane was charged into a 2 l. flask. A mixed gas of 40 mole percent of ethylene and 60 mole percent of propylene was passed thereto at 15° C. to saturate the normal heptane. 130 millimoles of 1,4-hexadiene, 6 millimoles of ethyl aluminum sesquichloride and 0.6 millimole of monochlorovanadyl-dicyclohexoxide were added thereto, and the reaction was effected for 50 minutes while passing in the mixed gas at the afore-described rate with stirring.

Treating the reaction mixture obtained in the same manner as in Example 1, there were obtained 23.2 g. of a white solid copolymer having an intrinsic viscosity of 0.91 dl./g., a propylene content of 28.7 mole percent and an iodine value of 17.6.

Repeating the above reaction with vanadyl trichloride in place of monochlorovanadyl-dicyclohexoxide, there were obtained 17.7 g. of a white solid copolymer having an intrinsic viscosity of 1.58 dl./g., a propylene content of 35.3 mole percent and an iodine value of 10.6.

As is obvious from these experiments, monochlorovanadyl-dicyclohexoxide involves less retarding effect and increases the copolymerizability of the diene.

EXAMPLE 5

Repeating the reaction in the same manner as in Example 4 except that 80 millimoles of isoprene in place of 1,4-hexadiene, 3 millimoles of ethyl aluminum sesquichloride and 0.3 millimole of monochlorovanadyl-dicyclohexoxide were used, there were obtained 16.1 g. of a white solid copolymer having an intrinsic viscosity of 0.85 dl./g., a propylene content of 21.5 mole percent and an iodine value of 3.6.

Repeating the foregoing reaction with the use of vanadyl trichloride in place of monochlorovanadyl-dicyclohexoxide, there were obtained 7.83 g. of copolymer having an intrinsic viscosity of 1.32 dl./g., a propylene content of 35.3 mole percent and an iodine value of 0.9.

As is obvious from these experiments, monochlorovanadyl-dicyclohexoxide involves less retarding effect and increases the copolymerizability of the diene.

EXAMPLE 6

Repeating the reaction in the same manner as in Example 5 except that ethylaluminium dichloride was used in place of ethylaluminium sesquichloride, there were obtained 3.42 g. of a copolymer having an intrinsic viscosity of 0.70 dl./g., a propylene content of 35.7 mole percent and an iodine value of 18.6.

The iodine value of a copolymer obtained by repeating the foregoing reaction with vanadyl trichloride in place of monochlorovanadyl-dicyclohexoxide was 7.6.

EXAMPLE 7

Mixing and reacting a solution of 2.98 g. (24 millimoles) of 5-hydroxymethyl-2-norbornene in 20 ml. of benzene and a solution of 2.08 g. (12 millimoles) of vanadyl chloride in 20 ml. of benzene, there was prepared a solution of monochlorovanadyl-dinorbornylmethoxide having a concentration of 0.3 millimole/ml. Repeating the polymerization in the same manner as in Example 5 except that monochlorovanadyl-dinorbornylmethoxide was used in place of monochlorovanadyl-dicyclohexoxide, there were obtained 2.60 g. of a white solid copolymer having an intrinsic viscosity of 0.80 dl./g., a propylene content of 32.3 mole percent and an iodine value of 12.6.

EXAMPLE 8

1 liter of normal heptane was charged into a 2 l. flask. A mixed gas of 40 mole percent of ethylene and 60 mole percent of propylene and hydrogen were passed at 30° C to the resultant normal heptane at the rates of 10 Nl./min. and 2 Nl./min. respectively to saturate the normal heptane. 10 millimoles of 5-ethylidene-2-norbornene, 4 millimoles of ethylaluminum sesquichloride and 0.2 millimole of vanadyl-tricyclohexoxide were added, and the reaction was effected for 30 minutes while passing in the mixed gas and hydrogen at the foregoing rates with stirring.

Treating the reaction mixture in the same manner as in Example 1, there were obtained 15.8 g. of a white solid copolymer having an intrinsic viscosity of 1.50 dl./g., a propylene content of 36.3 mole percent and an iodine value of 19.5.

We claim:

1. A method for preparing an olefinic hydrocarbon copolymer which comprises contacting ethylene and an alpha-olefin having 3 to 20 carbon atoms, with or without a polyene compound, with (A) a vanadium compound having the general formula $VO(OR)_mX_{3-m}$, in which R is a radical containing cycloaliphatic hydrocarbon having 5 to 20 carbon atoms, X is a halogen atom and $m$ is an integer from 1 to 3, and (B) an organoaluminum compound having the general formula $AlR'_nX'_{3-n}$, in which R' is a hydrocarbon radical having 1 to 20 carbon atoms, X' is a halogen atom and $n$ is a number from 1 to 3, the concentration of (A) in the reaction medium being from $10^{-4}$ millimoles per liter to 50 millimoles per liter, and the molar ratio of (B) to (A) being from 1:1 to 10,000:1.

2. A method as in claim 1 in which a polyene is present, said polyene being a non-conjugated diene.

3. A method as in claim 1 in which a polyene is present, said polyene being a conjugated diene.

4. A method as in claim 1 in which the said cyclic hydrocarbon radical is cyclohexyl.

5. A method as in claim 4 in which the vanadium compound is vanadyl tricyclohexoxide.

6. A method as in claim 4 in which the vanadium compound is monochlorovanadyl-dicyclohexoxide.

7. A method as in claim 1 in which said cyclic hydrocarbon radical is bornyl.

8. A method as in claim 7 in which the vanadium compound is dichlorovanadylbornyloxide.

9. A method as in claim 1 in which said cyclic hydrocarbon radical is norbornyl.

10. A method as in claim 9 in which the vanadium compound is monochlorovanadyl-dinorbornyloxide.

11. A method as in claim 1 in which (B) is an alkyl aluminum halide.

12. A method as in claim 11 in which the alkyl aluminum halide is an alkyl aluminum sesquihalide.

13. A method as in claim 11 in which the alkyl aluminum halide is an alkyl aluminum dihalide.

14. A method as in claim 1 in which (B) is a trialkyl aluminum.

15. A method for preparing an olefinic hydrocarbon copolymer which comprises contacting ethylene and an alpha-olefin having 3 to 20 carbon atoms, with or without a polyene compound, with (A) a vanadium compound having the general formula $VO(OR)_mX_{3-m}$, in which R is a cyclic hydrocarbon radical selected from the group consisting of cyclopentyl, cyclohexyl, cycloheptyl, cyclooctyl, 3-cyclopentenyl, 2-cyclohexenyl, 2-cycloheptenyl, 4-cyclooctenyl, 2-methyl-cyclopentenyl, 3-tertiary-butyl-cyclohexyl, 4-phenyl-cyclohexyl, 1,3-dimethyl-cyclohexyl, 3-methyl-6-isopropyl-cyclohexyl, cyclopentyl-methyl, cyclohexyl-ethyl, cycloheptyl-ethyl, 2,2-biscyclo-hexyl-ethyl, 2-norbornyl, bornyl, 5-norbornen-2-yl, 3-pinanyl, cyclopentane-spiro-cyclobutan-3-yl, spiro-bicyclohexan-4-yl, 2-indenyl, and 1-indanyl, X is a halogen atom and $m$ is an integer from 1 to 3, and (B) an organo-aluminum compound having the general formula $AlR'_nX'_{3-n}$, in which R' is a hydrocarbon radical having 1 to 20 carbon atoms, X' is a halogen atom, and $n$ is a number from 1 to 3, the concentration of (A) in the reaction medium being from 0.1 to 10 millimoles per liter and the molar ratio of (B) to (A) being from 2:1 to 300:1.

16. A method as in claim 15 in which a polyene is present, said polyene being a non-conjugated diene.

17. A method as in claim 15 in which a polyene is present, said polyene being a conjugated diene.

18. A method as in claim 3 in which the said cyclic hydrocarbon radical is cyclohexyl.

19. A method as in claim 18 in which the vanadium compound is vanadyl tricyclohexoxide.

20. A method as in claim 18 in which the vanadium compound is monochlorovanadyl-dicyclohexoxide.

21. A method as in claim 3 in which said cyclic hydrocarbon radical is bornyl.

22. A method as in claim 21 in which the vanadium compound is dichlorovanadylbornyloxide.

23. A method as in claim 3 in which said cyclic hydrocarbon radical is norbornyl.

24. A method as in claim 23 in which the vanadium compound is monochlorovanadyl dinorbornyloxide.

25. A method as in claim 3 in which (B) is an alkyl aluminum halide.

26. A method as in claim 25 in which the alkyl aluminum halide is an alkyl aluminum sesquihalide.

27. A method as in claim 25 in which the alkyl aluminum halide is an alkyl aluminum dihalide.

28. A method as in claim 3 in which (B) is a trialkyl aluminum.

* * * * *